United States Patent [19]

Callon

[11] Patent Number: 5,633,866
[45] Date of Patent: May 27, 1997

[54] METHOD AND APPARATUS FOR ROUTING PACKETS IN NETWORKS HAVING CONNECTION-ORIENTED SUBNETWORKS

[75] Inventor: Ross W. Callon, Bedford, Mass.

[73] Assignee: Bay Networks, Inc., Santa Clara, Calif.

[21] Appl. No.: 700,313

[22] Filed: Aug. 19, 1996

Related U.S. Application Data

[63] Continuation of Ser. No. 560,047, Nov. 17, 1995, abandoned.

[51] Int. Cl.$^6$ ................................................. H04L 12/46
[52] U.S. Cl. ................................................. 370/397; 370/238
[58] Field of Search .......................... 370/60, 60.1, 94.1, 370/94.2, 94.3, 54, 16, 85.13; 395/200, 325

[56] References Cited

U.S. PATENT DOCUMENTS

| | | | |
|---|---|---|---|
| 5,115,495 | 5/1992 | Tsuchiya et al. | 370/94.1 |
| 5,128,926 | 7/1992 | Perlman et al. | 370/54 |
| 5,251,205 | 10/1993 | Callon et al. | 370/60 |
| 5,452,294 | 9/1995 | Natarajan | 371/54 |
| 5,497,368 | 3/1996 | Reijnierse et al. | 370/60 |

OTHER PUBLICATIONS

Callon, et al, "Routing in an Internetwork Environment," The Interoperability Report, Aug. 1989, vol. 3, No. 8, pp. 2–7.

Heinanen, "Multiprotocol Encapsulation Over ATM Adaptation Layer 5," Network Working Group Request for Comments: 1483, Jul. 1993, pp. 1–16.

Laubach, "Classical IP and ARP over ATM," Network Working Group Request for Comments: 1577, Jan. 1993, pp. 1–17.

Katz, et al, "NBMA Next Hop Resolution Protocol (NHRP)," Internet Draft (draft–ietf–rolc–nhrp–04.txt), May 1995.

Moy, "OSPF (Open Shortest Path First) Version 2," Network Working Group Request for Comments: 1583, Mar. 1994.

Callon, "Integrated PNNI for Multi–Protocol Routing," ATM Forum Technical Committee, 94–0789, Sep. 26, 1994, pp. 1–7.

Dykeman, et al, "PNNI Draft Specification," PNNI SWG, ATM Form 94–0471 R12, Oct. 1995.

*Primary Examiner*—Douglas W. Olms
*Assistant Examiner*—Ajit Patel
*Attorney, Agent, or Firm*—Blakely, Sokoloff, Taylor & Zafman

[57] ABSTRACT

A system for routing packets in a network environment having a connection-oriented subnetwork, a plurality of routers coupled to said connection-oriented subnetwork, and a plurality of established virtual circuits. A packet is received by a router for forwarding toward a packet destination. A best existing virtual circuit across said connection-oriented subnetwork is identified from said plurality of established virtual circuits. The best existing virtual circuit is analyzed to determine whether it is both feasible and efficient for forwarding the packet toward the packet destination. If the best existing virtual circuit is both feasible and efficient, then the packet is forwarded using the best existing virtual circuit. If the best existing virtual circuit is either not feasible or inefficient, then a new virtual circuit is established to an optimal next hop router and the packet is forwarded using the new virtual circuit.

23 Claims, 9 Drawing Sheets

METHOD AND APPARATUS FOR ROUTING PACKETS IN NETWORKS HAVING CONNECTION-ORIENTED SUBNETWORKS

This is a continuation of application Ser. No. 08/560,047, filed Nov. 17, 1995, now abandoned.

BACKGROUND OF THE INVENTION

1. Field of the Invention

The present invention relates to routing packets in a network environment. More specifically, routing packets in a network having routers coupled to a connection-oriented subnetwork and which forward connectionless datagrams.

2. Background

Computer networks provide a mechanism for transferring information between various locations. Large computer networks may be extended around the world to interconnect multiple geographic sites and thousands of hosts. Additionally, various types of internetworking devices have been developed to permit users (or nodes) of one network to communicate with users (or nodes) of other networks. These devices are often referred to as routers or gateways.

To transfer information from one node on a network to a node or group of nodes on another network, it is necessary to determine a path through the interconnected series of links and networks for the information to be propagated. Various routing protocols have been developed for calculating routes across interconnected networks.

Networks may include one or more "virtual networks" or "virtual subnetworks." A common situation for implementing virtual networks includes the routing of the internetwork protocol (IP) type networking packets over an asynchronous transfer mode (ATM) subnetwork. An ATM subnetwork is a connection-oriented network, meaning that data is forwarded over virtual circuits (VCs) by switching/forwarding devices referred to as ATM switches. Other examples of connection-oriented networks include X.25, Frame Relay, and Plain Old Telephone Service (POTS).

An ATM switch cannot forward data between a particular source and destination unless the ATM switch has first obtained and stored state information to manage the virtual circuit specifically related to the flow of data between the particular source and destination. ATM switches provide high performance by forwarding a large amount of data in a short period of time. The use of connection-oriented virtual circuits allows packets to be divided into smaller, fixed-length cells. Maintaining state information and using small cells minimizes the delay at the ATM switch when forwarding data.

Routers are connected to the ATM subnetwork as well as other subnetworks and are used to collect packets corresponding to multiple flows of datagrams from multiple sources to multiple destinations. Virtual circuits across the ATM subnetwork are used to carry information between various routers coupled to the subnetwork. A single virtual circuit, or a small number of virtual circuits, may be established and utilized between any particular pair of routers. The routers use a routing protocol between one another to calculate routes between the various routers. Where a virtual circuit exists between two routers, the routers can "advertise" a corresponding link between them into the routing protocol, thereby allowing other routers to learn of the link. A common routing protocol is a link state routing protocol. In a link state routing protocol, each node in the network (for example, a router) maintains information about each link in the network. A topology state routing protocol is a refinement of link state protocol in which significant status about the internal structure or operation of other nodes in the network may be maintained in addition to information about links.

In large networks, which may include hundreds or thousands of routers, it is impractical to maintain virtual circuits between every pair of routers. ATM switches are limited in their ability to store network state information. Therefore, the large amount of network state information required if all possible virtual circuits were established would be impractical and inefficient. Additionally, such a configuration would require that the network layer routing protocol consider every possible virtual circuit when calculating a route across the ATM subnetwork. Such a calculation cannot provide the efficient route computation necessary to efficiently transmit data over a network.

Instead of establishing every possible virtual circuit, a smaller set of virtual circuits are established between specific pairs of routers. Since virtual circuits are not established for every pair of routers, the resulting path between a particular pair of routers may utilize intermediate routers. This type of routing may be referred to as "roundabout routing" because it uses an indirect path via multiple routers to traverse the ATM subnetwork. The roundabout routing method locates the best path to the destination using only the set of virtual circuits established across the subnetwork. This method reduces the overall throughput of the network because many paths will pass through multiple routers, thereby increasing the overall delay involved in transferring a packet to its destination.

Another type of routing is referred to as "shortcut routing." Shortcut routing determines which exit router provides the best path for transmitting a particular packet toward its destination. A virtual circuit is then established between the entry router and the optimal exit router, thereby providing a direct path across the ATM subnetwork. Shortcut routing minimizes the delay associated with transferring packets across the ATM subnetwork by always establishing a direct virtual circuit to the optimal exit router. However, using shortcut routing in every situation is inefficient due to limitations of the ATM subnetwork to establish a large number of virtual circuits in a short period of time. Furthermore, as discussed above, ATM switches are limited in their ability to store link state information. As additional virtual circuits are established due to shortcut routing, additional state information must be stored by the routers and ATM switches. Therefore, use of shortcut routing may cause inefficient operation of the network.

It is therefore desirable to provide a system for determining when to use an existing virtual circuit for forwarding a packet across a subnetwork, and when it is preferable to establish a new virtual circuit for forwarding the packet.

SUMMARY OF THE INVENTION

The present invention provides a routing system for alleviating the problems associated with roundabout routing and shortcut routing discussed above. Specifically, the present invention determines whether it is feasible and efficient to forward a particular packet using an existing virtual circuit or whether a new virtual circuit should be established for forwarding the particular packet. The inventive routing system does not establish a new virtual circuit for routing every packet nor does it use an existing virtual circuit for routing every packet. Instead, the routing system quickly determines which approach is preferable considering the ability of existing virtual circuits to forward packets feasibly and efficiently to specific destinations. In some cases, the present invention will use an existing virtual circuit which is not the optimal path across the subnetwork.

One embodiment of the present invention provides a method for routing a packet in a network having a connection-oriented subnetwork, a plurality of routers coupled to the connection-oriented subnetwork, and a plurality of established virtual circuits. A packet is received for forwarding toward a packet destination. A best existing virtual circuit is identified from among the plurality of established virtual circuits. A determination is made regarding whether said best existing virtual circuit is feasible and efficient for forwarding the packet toward the packet destination. If the best existing virtual circuit is feasible and efficient, then the packet is forwarded using the best existing virtual circuit. If the best existing virtual circuit is either not feasible or inefficient, then a new virtual circuit is established to an optimal next hop router and the packet is forwarded using the new virtual circuit.

Another feature of the present invention provides for determining feasibility by calculating a first distance to the packet destination considering all possible virtual circuits across the connection-oriented subnetwork. A second distance is determined from an opposite end of an established virtual circuit to the packet destination. The best existing virtual circuit is determined to be feasible if the second distance is less than the first distance.

An additional feature of the present invention provides for determining efficiency of a virtual circuit by testing the virtual circuit to determine whether the virtual circuit makes a particular minimum progress toward said packet destination. This minimum progress may be a fraction of the progress made by an optimal virtual circuit. Additionally, the minimum progress may be a fraction of a cost associated with traversing the virtual circuit.

Another feature of the present invention provides for analyzing each established virtual circuit for determining whether the virtual circuit should be closed. This analysis may include providing a timer for each virtual circuit for determining the utilization of the virtual circuit. The timer is reset each time a packet is detected on the virtual circuit. The timer is incremented when a packet absence is detected on the virtual circuit. The virtual circuit is closed when the timer reaches a predetermined timeout value.

BRIEF DESCRIPTION OF THE DRAWINGS

The present invention is illustrated by way of example in the following drawings in which like references indicate similar elements.

DETAILED DESCRIPTION OF THE PREFERRED EMBODIMENT

The following detailed description sets forth numerous specific details to provide a thorough understanding of the present invention. However, those skilled in the art will appreciate that the present invention may be practiced without these specific details. In other instances, well known methods, procedures, components, protocols, and circuits have not been described in detail so as not to obscure the present invention.

The present invention is related to routing packets in a network having routers coupled to a connection-oriented subnetwork. For illustration purposes, the following detailed description refers to an ATM subnetwork as the connection-oriented subnetwork. Those skilled in the art will understand that an ATM subnetwork is only one type of connection-oriented subnetwork. Other types of connection-oriented subnetworks include, but are not limited to, X.25, Frame Relay, and POTS (Plain Old Telephone Service). The present invention may be applied to any type of connection-oriented subnetwork using the structures and methods described herein and is not limited to ATM subnetworks.

Figure 1:
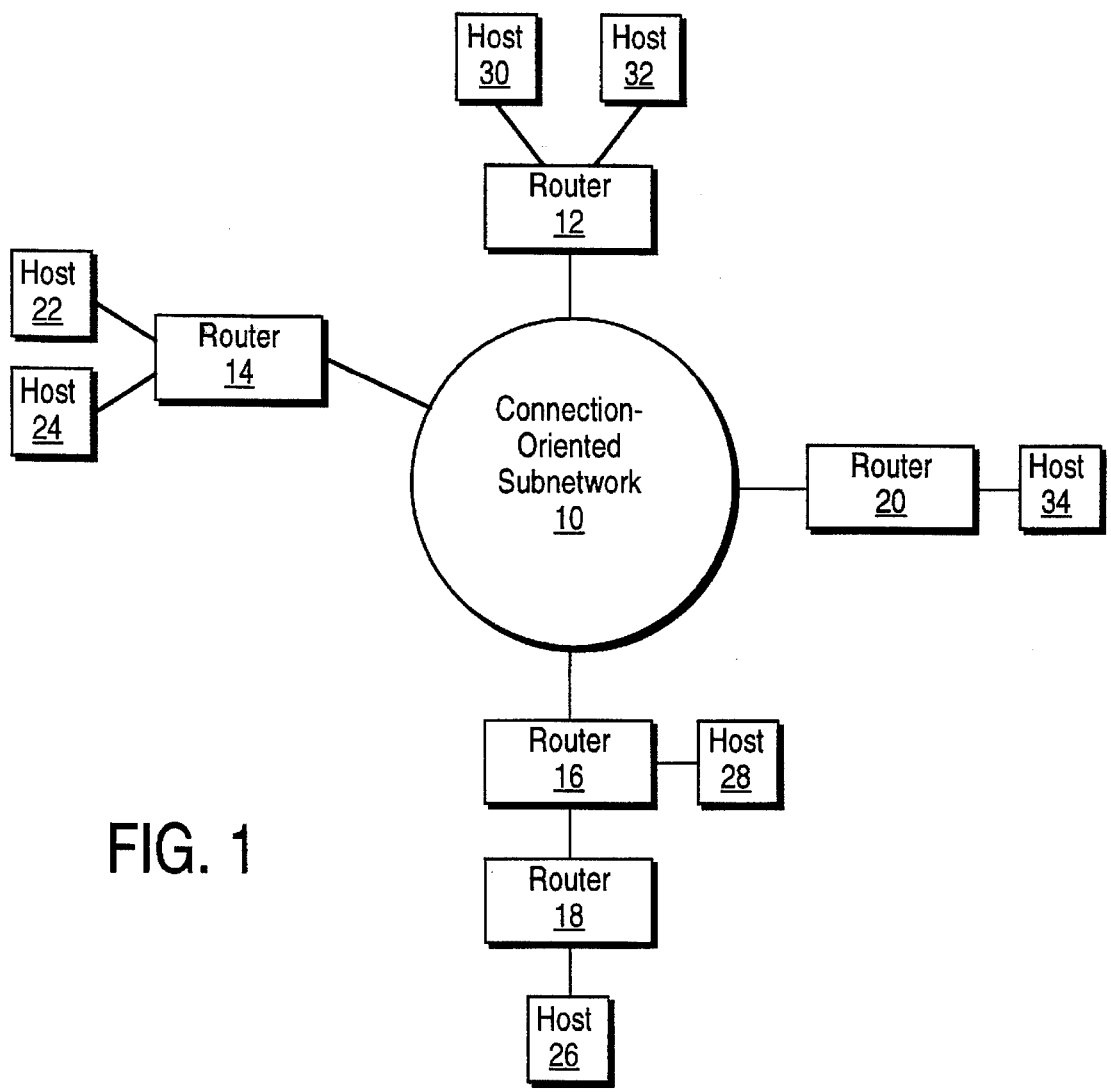
FIG. 1 is a diagram of a network configuration having multiple routers connected to a connection-oriented subnetwork capable of utilizing the present invention.

Referring to FIG. 1, a diagram of a simple network configuration is illustrated in an embodiment having multiple routers coupled to a connection-oriented subnetwork. The illustrated network has been reduced in size for explanation purposes. Actual networks may include thousands of routers with numerous hosts connected to each router.

The configuration illustrated in FIG. 1 includes a connection-oriented subnetwork 10 and five multiprotocol routers (12, 14, 16, 18, and 20). Several hosts or "Data Terminal Equipment (DTE)" (22, 24, 26, 28, 30, 32, and 34) are connected to the routers. Four routers (12, 14, 16, and 20) are directly connected to connection-oriented subnetwork 10 while router 18 is coupled to router 16. If router 18 has a packet which must be delivered to a host 28, the packet may be forwarded via router 16 to host 28. In this case, the packet need not be forwarded across connection-oriented subnetwork 10. However, if router 16 has a packet for delivery to a host 22 attached to router 14, then router 16 must forward the packet across subnetwork 10. Similarly, any other router having a packet which must be delivered to a router located across subnetwork 10 must forward the packet using the subnetwork.

Those skilled in the art will recognize that the hosts (22–34) illustrated in FIG. 1 may be coupled to the routers in various manners, such as using direct coupling and physical networks, as well as other connection mechanisms.

Figure 7:
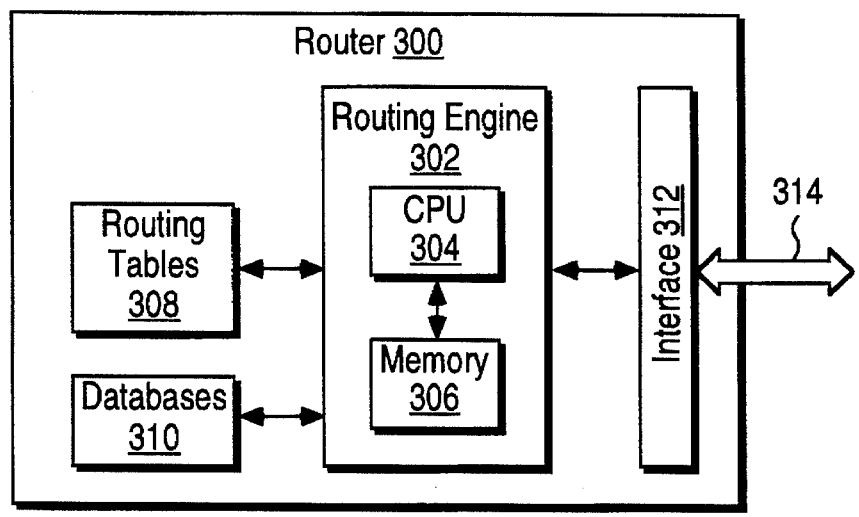
FIG. 7 is a block diagram of a router capable of incorporating the teachings of the present invention.

Referring to FIG. 7, a block diagram of a typical router 300 is illustrated. Router 300 is capable of incorporating the teachings of the present invention and includes a router engine 302 having a CPU 304 and a memory device 306. Router engine 302 is coupled to various routing tables 308 and databases 310 capable of storing information necessary for router 300 to properly forward packets toward their destination. Databases 310 may include a Link State Database, a Path Database, a Tent Database, and a Forwarding Database. An interface 312 is coupled to router engine 302 and provides the physical connection to a network 314. Those skilled in the art will recognize that various router types may be used with the invention described herein.

Figure 2:
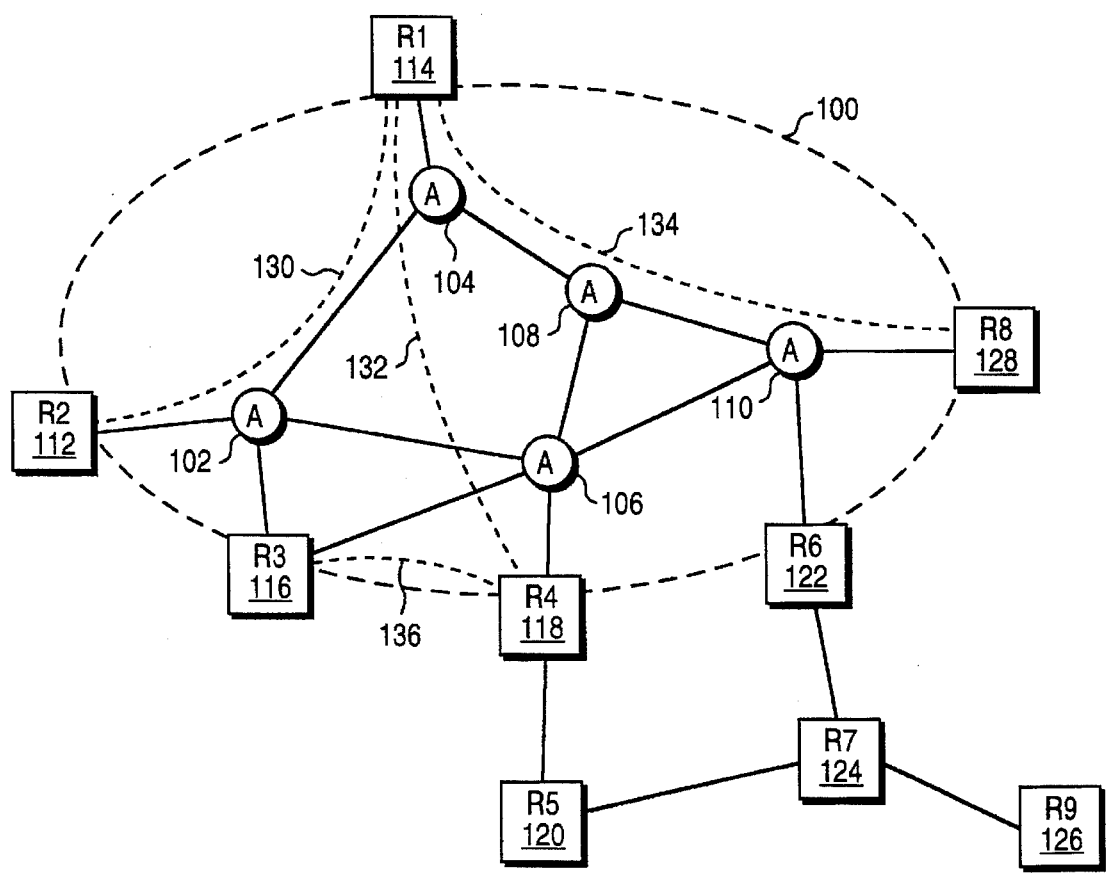
FIGS. 2 and 3 are diagrams of network configurations having multiple routers connected to an ATM subnetwork.

FIG. 2 illustrates a diagram of a simple network configuration having multiple routers connected to an ATM subnetwork. To simplify the diagram, host devices and their connections are not shown. As discussed above, an ATM subnetwork is one example of a connection-oriented subnetwork with which the present invention may be practiced.

The configuration illustrated in FIG. 2 includes an ATM subnetwork 100 having five ATM switches (102, 104, 106, 108, and 110) linked together as shown. Six routers (112, 114, 116, 118, 122, and 128) are connected directly to ATM subnetwork 100. Routers 120, 124, and 126 are not connected directly to subnetwork 100, but are coupled to routers capable of forwarding packets over the subnetwork. For example, router 120 can forward a packet via router 118 if the packet is destined for a router across ATM subnetwork 100. Similarly, router 126 can forward packets via router 124 and router 122 to reach subnetwork 100. The configuration of FIG. 2 also includes four virtual circuits (130, 132, 134, and 136) established across subnetwork 100. Virtual circuit 130 connects routers 112 and 114, circuit 132 connects routers 114 and 118, circuit 134 connects routers 114 and 128, and circuit 136 connects routers 116 and 118. Throughout the description of the invention, the term "virtual circuit" is used to denote switched virtual circuits (SVCs) as well as permanent virtual circuits (PVCs).

Each ATM switch in ATM subnetwork 100 maintains the state of all other ATM switches in the subnetwork based on information exchanged using a link state or topology state routing protocol. In one embodiment of the present invention, the state information is exchanged using the ATM Forum standard Private Network to Network Interface (PNNI) routing protocol.

Each router maintains the state of all other routers and ATM switches on the network based on information received from the routing protocol. In one embodiment, state information is received in Integrated PNNI (I-PNNI) Topology State Packets (PTSPs) and consists of the standard required information which is advertised in I-PNNI PTSPs.

Since only four virtual circuits are provided in the configuration of FIG. 2, all possible paths across subnetwork 100 are not available. For example, if router 112 has a packet to be delivered to a host attached to router 122, no virtual circuit is available for routing the packet. In this case, a new virtual circuit must be established for routing the packet. However, if router 112 has a packet for delivery to a host connected to router 114, then virtual circuit 130 may be used to forward the packet. In another situation, if router 120 has a packet for delivery to a host attached to router 114, the packet may be forwarded to router 118 and then to router 114 using virtual circuit 132.

In the situation where router 114 has a packet for delivery to a host attached to router 116, a path exists between the two routers, but two different virtual circuits 132 and 136 must be used. Using the roundabout routing method, the packet will automatically be forwarded to router 118 using virtual circuit 132 and then to router 116 using virtual circuit 136. The roundabout method does not consider establishing a new virtual circuit directly between routers 114 and 116, but instead uses the two existing virtual circuits. In contrast, the shortcut routing method will automatically establish a new virtual circuit between routers 114 and 116 for forwarding the packet across subnetwork 100. The shortcut method does not consider the use of existing virtual circuits 132 and 136.

The present invention is concerned with processing packets received by a router and awaiting forwarding. Therefore, it is important to make a routing decision quickly such that the packet is forwarded in a timely manner. The method used to route packets across the connection-oriented subnetwork determines whether a virtual circuit already exists which is both "feasible" and "efficient." A virtual circuit is "feasible" for a specified destination if it makes some progress toward the destination and will not loop. A feasible virtual circuit ensures that the packet will be delivered to its destination. A virtual circuit is "efficient" if the circuit moves the packet a specific minimum distance closer to the destination. To be "efficient", a virtual circuit must represent a practical use of the network resources. An inefficient virtual circuit may result in multiple hops across the ATM subnetwork, thereby reducing the overall efficiency of the network. Determining feasibility and efficiency will be described in greater detail below.

If a virtual circuit exists which is both feasible and efficient, then the packet is forwarded using the existing virtual circuit. If no existing virtual circuit is both feasible and efficient, then a new virtual circuit is established between the source router (the router having the packet to be forwarded) and the exit router (the next hop router on the best path to the destination). The packet is then forwarded using this new virtual circuit.

Figure 4:
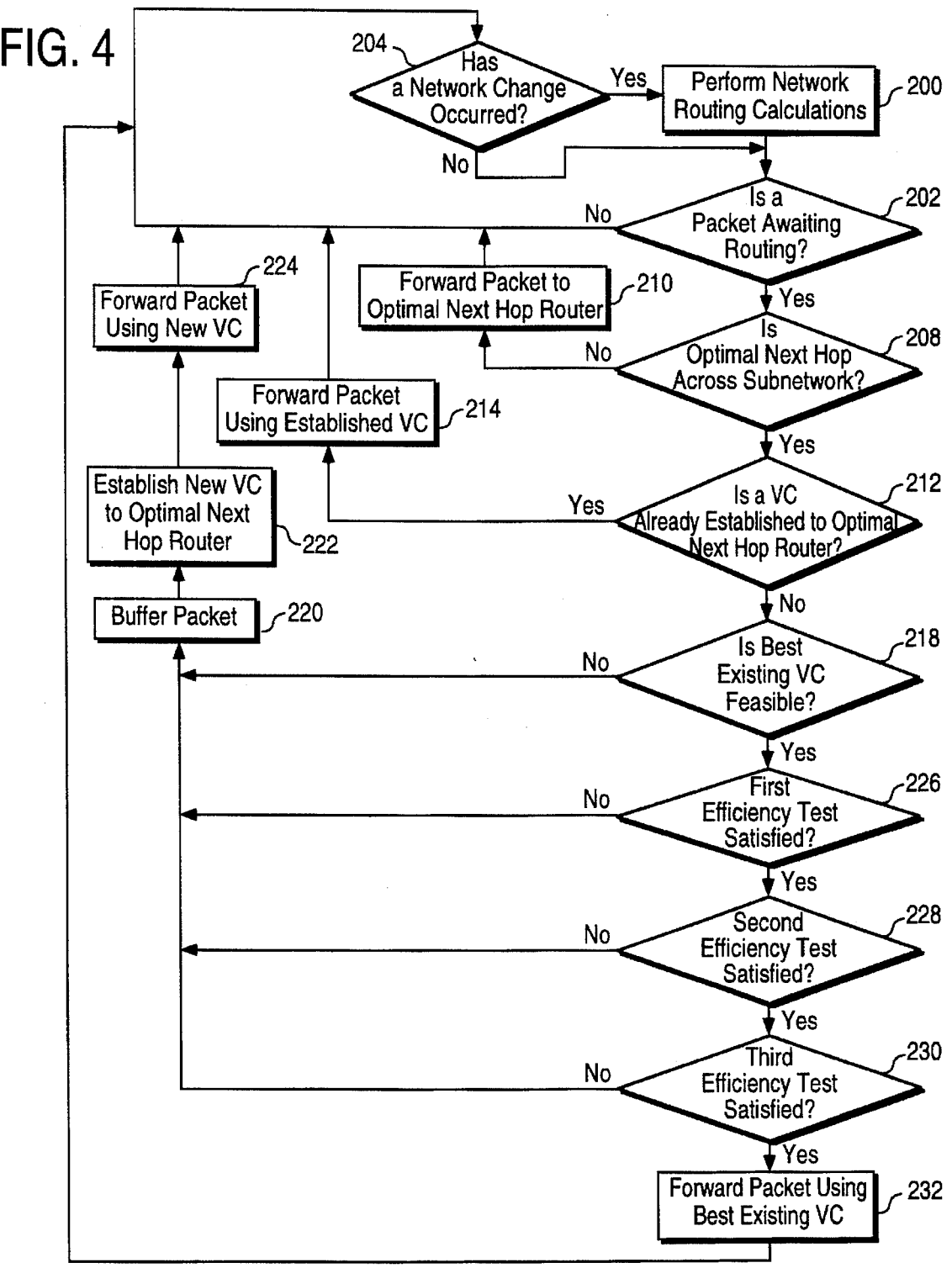
FIG. 4 is a flow diagram illustrating the calculations and determinations for routing a particular packet in accordance with the present invention.

The routing procedure provided by the present invention is illustrated in FIG. 4. At step 200, various network routing calculations are performed. These calculations are performed by the router before a packet arrives such that the results of the calculations are available when a packet is received by the router for forwarding. The specific calculations performed are described below with reference to FIGS. 5A and 5B. At step 202, the router determines whether a packet has been received and is waiting to be forwarded. If no packet has been received, the routine branches to step 204 which determines whether the state of the network has changed. A network change may result from a change as reported in the routing protocol link state update packets, or as a result of a change in the state of virtual circuits available to the router. For example, a new virtual circuit may be established by the source router or a new virtual circuit may arrive from another router. If a network change is indicated at step 204, then the routine branches to step 200 to incorporate the network changes into the routing calculations. If the state of the network has not changed, then the routine branches from step 204 back to step 202.

At step 202, if a packet is waiting, the routine branches to step 208 to determine whether the optimal next hop router is located across the connection-oriented subnetwork. If step 208 determines that the optimal next hop router is not located across the subnetwork, then the routine branches to step 210 where the packet is forwarded directly to the optimal next hop router. The routine then returns to step 204 to determine whether any network changes have occurred.

If step 208 determines that the optimal next hop router is located across the subnetwork, then the routine branches to step 212. Step 212 determines whether a virtual circuit is already established to the optimal next hop router. If a virtual circuit already exists, then the packet is forwarded using that virtual circuit at step 214. If no virtual circuit exists to the optimal next hop router, then the routine branches from step 212 to step 218 which determines whether the best existing virtual circuit is feasible. A discussion of the method of determining feasibility of virtual circuits is provided below.

If step 218 determines that the best existing virtual circuit is not feasible, then the routine branches to step 220 where the packet is buffered while a new virtual circuit is established. The routine continues to step 222 where the new virtual circuit is established from the source router to the optimal next hop router. At step 224, the packet is forwarded to the optimal next hop router using the new virtual circuit. The routine then returns to step 204.

If step 218 determines that the best existing virtual circuit is feasible, then the routine branches to steps 226, 228, and 230 to determine whether each of the three efficiency tests have been satisfied. If any one of the three efficiency tests is not satisfied then the routine branches to steps 220, 222, and 224 where a new virtual circuit is established for forwarding the packet across the subnetwork to the optimal next hop router. Details regarding the three efficiency tests will be discussed below.

If all three of the efficiency tests are satisfied in steps 226, 228, and 230, then step 232 forwards the packet across the subnetwork using the best existing virtual circuit. The routine then returns to step 204.

Figure 5A:
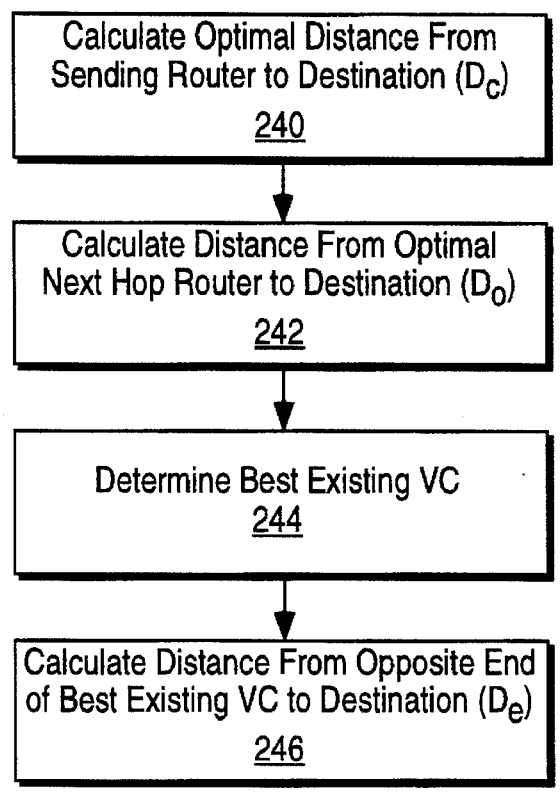
FIGS. 5A and 5B are flow diagrams illustrating the calculations and determinations performed by a router in accordance with the present invention.

FIG. 5A is a flow diagram illustrating the calculations performed by a router in accordance with the present invention to determine feasibility of a virtual circuit. At step 240, the sending router first determines the optimal path from the sending router to the destination based on all possible paths. This calculation considers any path across the ATM subnetwork, including virtual circuits which have not yet been established. This optimal path distance is referenced by $D_c$ and may be calculated by running the Dijkstra algorithm to find a path from the current router to the destination. The Dijkstra algorithm is used to calculate the best routes from a particular router to all other routers in the network. Those skilled in the art will be familiar with the implementation of the Dijkstra algorithm. Furthermore, artisans of ordinary skill will understand that other methods may be used to calculate the optimal path distance $D_c$.

The "distance" between any two points in a network environment is commonly referred to as the "cost" assigned to a particular link or series of links. For example, links may be located between two routers, between a router and a connection-oriented subnetwork, or between two switches within a connection-oriented subnetwork. Referring to FIG. 2, an example is provided where each link in subnetwork 100 is assigned a cost of 1, and each link between two routers is assigned a cost of 2. If router 114 has a packet for delivery to a host connected to router 126, the optimal path is across subnetwork 100, and via routers 122 and 124. To determine the cost of the optimal path, four links through subnetwork 100 result in a cost of 4. The four links are from router 114 to switch 104, then to switch 108, then to switch 110, and finally to router 122. The two router-to-router links (router 122 to 124, and router 124 to 126) result in a cost of 4. Therefore, the optimal path distance between routers 114 and 124 has a cost of 8, which corresponds to $D_c$. This example is provided to illustrate the assignment of a cost to a particular path in the network. In a larger network, the Dijkstra algorithm may be used to identify the optimal path and the cost of that optimal path. Note, the above calculations ignore the fact that a virtual circuit does not currently exist between routers 114 and 124.

Referring again to FIG. 5A, step 242 calculates the distance from the optimal next hop router to the destination considering all possible paths and all possible virtual circuits, regardless of whether they currently exist. The distance from the optimal next hop router to the destination is referred to as $D_o$ and is calculated by subtracting the cost of the path, if any, across the immediately adjacent ATM subnetwork from the distance $D_c$. Thus, if the optimal next hop is not across the ATM subnetwork then nothing is subtracted from the distance $D_c$, resulting in $D_o=D_c$.

Referring to FIG. 2, if router 114 has a packet for delivery to a host connected to router 126, the optimal path is via subnetwork 100, and routers 122 and 124. The optimal next hop router is router 122. The distance $D_o$ from router 122 to router 126 is 4 (two links, each having a cost of 2).

Steps 244 and 246 of FIG. 5A perform a calculation referred to as the "existing virtual circuits computation" which assumes that packets may be forwarded across the ATM subnetwork using only existing virtual circuits. However, routers located on the other side of the ATM subnetwork may use any possible path, including virtual circuits which have not been established. Step 244 determines the best existing virtual circuit by using the Dijkstra algorithm to determine a single path from the source router to each possible destination considering all existing virtual circuits. Rather than executing the Dijkstra algorithm once from the other end of each existing virtual circuit, the algorithm is executed once to simplify and expedite the calculation. The single path generated by the Dijkstra algorithm from the source router to the particular destination is used to select the best existing virtual circuit. At step 246, the distance from the other end of the best existing virtual circuit to the destination is calculated and represented by $D_e$.

Referring to FIG. 2, if router 114 has a packet for delivery to a host connected to router 126, the only existing path is via virtual circuit 132 and routers 118, 120, and 124. Since a virtual circuit does not exist between routers 114 and 122, $D_e$ is not calculated for the non-existent virtual circuit. In this example, the best (and only) path currently available between routers 114 and 126 is via virtual circuit 132. The distance for $D_e$ in this example is 6 (three router-to-router links).

In another embodiment, the Dijkstra algorithm is executed once for each virtual circuit across the subnetwork. The algorithm is used to determine the best path from each exit router to the destination based on any available path. This approach represents a more complicated and time-consuming calculation, but results in a greater likelihood of finding a feasible and efficient path based on existing virtual circuits.

If $D_o=D_e$ then the optimal next hop uses an existing virtual circuit. This determination corresponds to step 212 in FIG. 4. In this situation, the existing virtual circuit is used to forward the packet toward its destination. Based on the above example using FIG. 2, $D_o=4$ and $D_e=6$. Therefore, since $D_o$ does not equal $D_e$ the optimal next hop does not use an existing virtual circuit.

If $D_o \neq D_e$, then the source router must determine whether the next hop using existing virtual circuits is feasible for the specified destination (FIG. 4, step 218). A feasible next hop is defined as a hop which moves the packet closer to its destination while avoiding looping of the packet. Using the above calculations, if $D_e \geq D_c$ then the path using the best existing virtual circuit is not feasible for the specified destination. Since $D_e$ represents the distance from the other side of the ATM subnetwork to the destination, if $D_e$ is greater than the distance from the source router using the optimal path then the best existing virtual circuit fails to make any progress toward the destination.

In the above example using FIG. 2, $D_c=8$ and $D_e=6$. Therefore, since $D_e$ is less than $D_c$, virtual circuit 132 is feasible for routing the packet toward its destination (router 126).

If $D_e=D_c$ then the best existing virtual circuit is not feasible because there is a possibility of looping. An example of this potential looping is provided below with reference to FIG. 3.

If $D_e \geq D_c$ then no existing virtual circuit moves the packet closer to the destination. Therefore, a new virtual circuit must be established between the source router and the optimal next hop router as determined in the calculation of $D_c$.

If $D_e<D_c$ then the best existing virtual circuit moves the packet closer to its destination. Therefore, the best existing virtual circuit is feasible and it is not necessary to establish a new virtual circuit for routing the packet.

The above calculations determine whether a particular virtual circuit is feasible; i.e., whether it makes progress toward the destination and avoids the possibility of looping. However, it may be undesirable to use a feasible existing virtual circuit if the router on the other side of the ATM subnetwork is only slightly closer to the destination. Using such a virtual circuit may result in multiple hops across the ATM subnetwork, causing inefficient operation of the network. Therefore, an embodiment of the present invention provides for specifying a minimum progress toward the destination which must be accomplished by the virtual circuit to be considered "efficient."

Figure 5B:
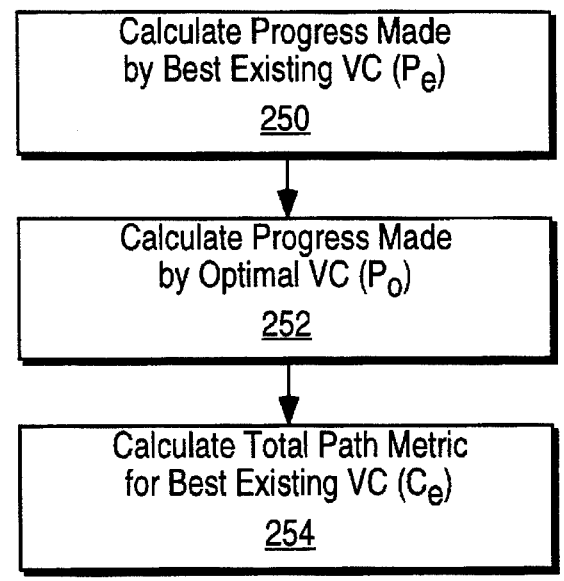

Referring to FIG. 5B, a calculation is performed at step 250 to determine the progress made by the best existing virtual circuit, represented by $P_e$. Since a virtual circuit can move closer to the destination or move away from the destination, $P_e$ may be positive or negative. $P_e$ is defined by the equation $P_e=D_c-D_e$. Using the above example with reference to FIG. 2, $P_e=8-6=2$.

In step 252 of FIG. 5B, $P_o$ represents the progress made by the optimal virtual circuit; i.e., the virtual circuit used if all possible virtual circuits are available. $P_o$ is represented by the equation $P_o=D_c-D_o$. Using the above example, $P_o=8-4=4$. Since the optimal virtual circuit makes greater progress toward the destination than the existing virtual circuit, the next step is to determine whether it is efficient to open the optimal virtual circuit or use the existing, less optimal virtual circuit.

Each virtual circuit has a particular cost associated with traversing the circuit. The total path metric for the best existing virtual circuit is calculated as the sum of all of the metrics of each component the virtual circuit crosses. This total path metric is represented by $C_e$. Step 254 of FIG. 5B calculates the total path metric $C_e$ for the best existing virtual circuit.

The calculations illustrated in FIGS. 5A and 5B and described above are performed by the router prior to packet arrival. Thus, the results of the various calculations and determinations are available when a packet is received for forwarding, thereby permitting timely forwarding of the packet toward its destination.

As illustrated in FIG. 4, at steps 226, 228, and 230, three different efficiency tests may be used to determine whether the best existing virtual circuit (the circuit represented by $P_e$) is efficient. First, at step 226, the router may require that the progress made by the best existing virtual circuit be at least some fraction "k" of the progress made by the optimal virtual circuit ($P_o$). The fraction "k" is defined by $0<k\leq1$. The first efficiency test is represented by the equation $P_e \geq k \cdot P_o$.

Continuing with the above example, a fraction $k=0.4$ may be used to indicate that an existing virtual circuit must progress at least 40% of the distance progressed by the optimal virtual circuit. Otherwise, the existing virtual circuit is not considered efficient. In the above example, $k \cdot P_o=1.6$. Therefore, since $P_e$ (2) is greater than 1.6, the existing virtual circuit satisfies this first efficiency test.

A second efficiency test, step 228, may require that the best existing virtual circuit make some minimum progress, defined by $P_{min}$, toward the destination. Using the above example, $P_{min}$ may be selected as 1.0. Therefore, the best existing virtual circuit must satisfy the equation $P_e \geq 1.0$. In the above example, $P_e=2$, thereby satisfying the second efficiency test.

A third efficiency test, step 230, may require that the progress made by crossing the best existing virtual circuit is at least a minimum fraction r of the cost associated with traversing the best existing virtual circuit ($C_e$). This requirement is represented by the equation $P_e \geq r \cdot C_e$.

In the above example, the total path metric for virtual circuit 132 is 4 ($C_e=4$). If $r=0.5$ then $r \cdot C_e=2$. Since $P_e=2$, the third efficiency test is satisfied.

The values of k, r, and $P_{min}$ may be configured by the network operator or administrator. Additionally, default values may be provided for k, r, and $P_{min}$ which are used in the absence of values provided by the network operator or administrator.

If any one of the three efficiency tests are not satisfied, then the best existing virtual circuit is not used. Instead, a new virtual circuit is opened across the ATM subnetwork from the source router to the optimal next hop router.

To summarize, a best existing virtual circuit is feasible if $D_e<D_c$. The best existing virtual circuit is efficient if each of the following are true: $(P_e \geq k \cdot P_o)$, $(P_e \geq P_{min})$, and $(P_e \geq r \cdot C_e)$.

Therefore, the best existing virtual circuit is both feasible and efficient if the following conditions are satisfied:

$(D_e<D_c)$ and $(P_e \geq k \cdot P_o)$ and $(P_e \geq P_{min})$ and $(P_e \geq r \cdot C_e)$.

Although three different efficiency tests have been described, those skilled in the art will appreciate that it is not necessary to use all of the above tests. Instead, a subset of the efficiency tests may be used by any particular router. Furthermore, by altering the values of k, r, and $P_{min}$, one or more of the efficiency tests may be effectively eliminated. For example, if $r=0$ or $k=0$, then the equations for the first and third efficiency tests become $P_e \geq 0$. Thus, any positive value for $P_e$, including zero, will satisfy the test. In this manner, all three of the efficiency tests may be eliminated by setting each of the values k, r, and $P_{min}$ equal to zero.

Figure 8:
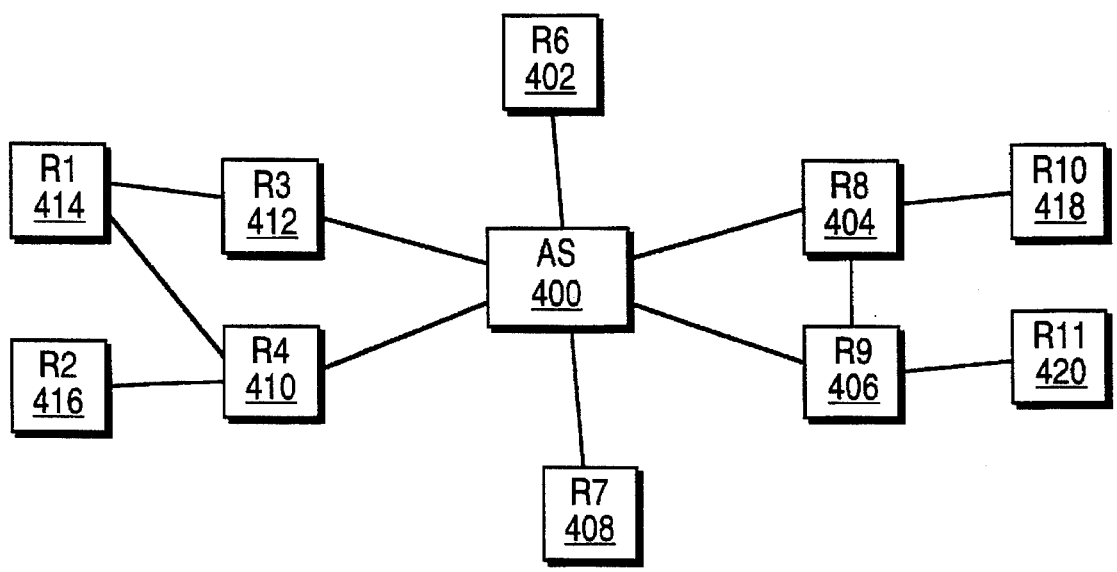
FIG. 8 is a network diagram illustrating a logical router topology.

In accordance with the present invention, the preceding calculations to determine feasibility and efficiency may be performed by an algorithm operating on a router. As illustrated in FIG. 8, router 300 includes routing tables 308 and databases 310 coupled to router engine 302. This configuration is capable of receiving and storing the parameters necessary to perform the above calculations. Router engine 302 is capable of performing the previously described calculations. Those skilled in the art will be familiar with various methods and procedures used to implement the above calculations and determinations.

Although the present invention selects the best existing virtual circuit, that existing virtual circuit may not be feasible. In the embodiment where the Dijkstra algorithm is executed once, there may be situations where the best existing virtual circuit is not feasible, yet another virtual circuit is feasible. An example is illustrated below with reference to FIG. 3. Although the calculations and determinations utilized by this embodiment of the present invention may occasionally select a non-feasible path when a feasible path does exist, the required calculations are performed in a considerably faster manner, thereby increasing the overall efficiency of the routing operation.

Figure 3:
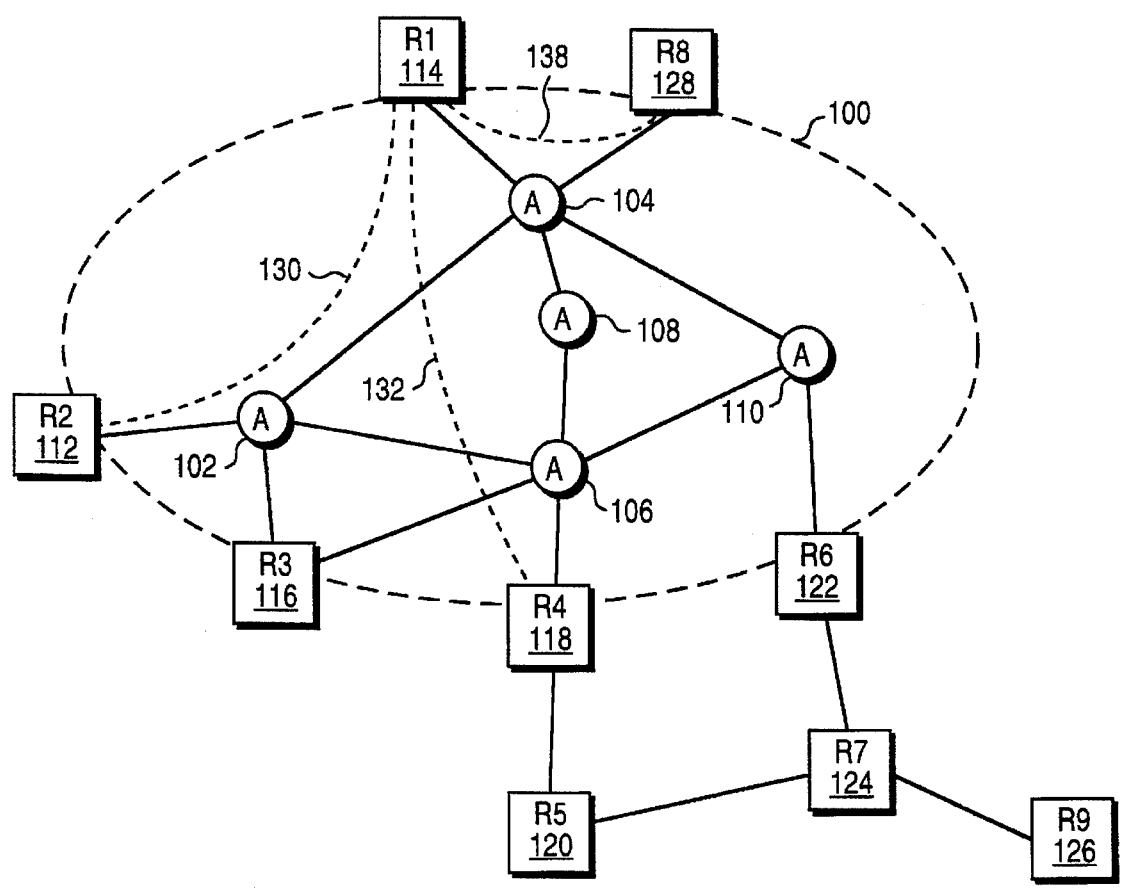

Referring to FIG. 3, a simple network configuration is illustrated having multiple routers connected to an ATM subnetwork. FIG. 3 is similar to FIG. 2, but provides a different interconnection among the ATM switches (102–110). As with FIG. 2 above, each link in the ATM subnetwork is assigned a cost of 1 and each router-to-router link is assigned a cost of 2.

If router 114 has a packet to be delivered to router 126, the optimal path is across ATM subnetwork 100 to router 122 and then via router 124. The optimal cost $D_c=7$. Since the virtual circuit between routers 114 and 122 does not exist, router 114 must determine whether to use an existing virtual circuit or establish a new virtual circuit to router 122.

The existing virtual circuits calculation, discussed above, calculates paths assuming that the first hop from router 114 must use an existing virtual circuit. Therefore, the first hop can be to router 112, router 118 or router 128. The cost from router 114 to router 126 using virtual circuit 130 is 11 (virtual circuit 130 has cost 3, and router 112 to router 126 via router 122 has cost 8). Using router 118, the cost to router 126 is 10 (virtual circuit 132 has cost 4, and router 118 to router 126 has cost 6). Using router 128, the cost to router 126 is 9 (virtual circuit 138 has cost 2, and router 114 to router 126 via router 122 has cost 7).

Therefore, based on the existing virtual circuits calculation, the path using router 128, having cost 9, is selected as the best existing virtual circuit, based on the lowest cost. However, the cost from router 114 to router 126 (using the all possible routes calculation) is equal to the cost from router 128 to router 126 (using the existing virtual circuits calculation). Therefore, since $D_c=D_e$, virtual circuit 138, which was selected as the best existing virtual circuit, is not feasible. Virtual circuit 138 is not feasible because when the packet reaches router 128, the above calculations will be performed again and possibly cause router 128 to forward the packet back to router 114, therefore creating a loop.

Since the selected virtual circuit 138 is not feasible, router 114 will establish a new virtual circuit to router 122 for forwarding the packet toward its destination. In this example, virtual circuit 132 is feasible, but was not selected as the best existing virtual circuit because it did not have the lowest cost. Virtual circuit 132 is feasible because $D_c=7$ (via router 122) and $D_e=6$ (router 118 to router 126 via routers 120 and 124).

Therefore, selection of virtual circuit 132 was sacrificed in exchange for the overall efficiency of the routing operation.

As discussed above, ATM switches are limited in the number of virtual circuits they can maintain. Therefore, it is important to close virtual circuits not being utilized. However, connectionless Internet Protocols do not indicate an absence of traffic to send. Instead, the transmission of packets simply stops. In one embodiment of the present invention, the router determines whether a particular virtual circuit should be closed if no packets have been transmitted over the virtual circuit for a predetermined period of time. A particular virtual circuit is monitored using a timer which is reset each time a packet is received from the virtual circuit or transmitted over the virtual circuit. If the timer reaches a predetermined value prior to being reset, then the virtual circuit is closed.

Figure 6:
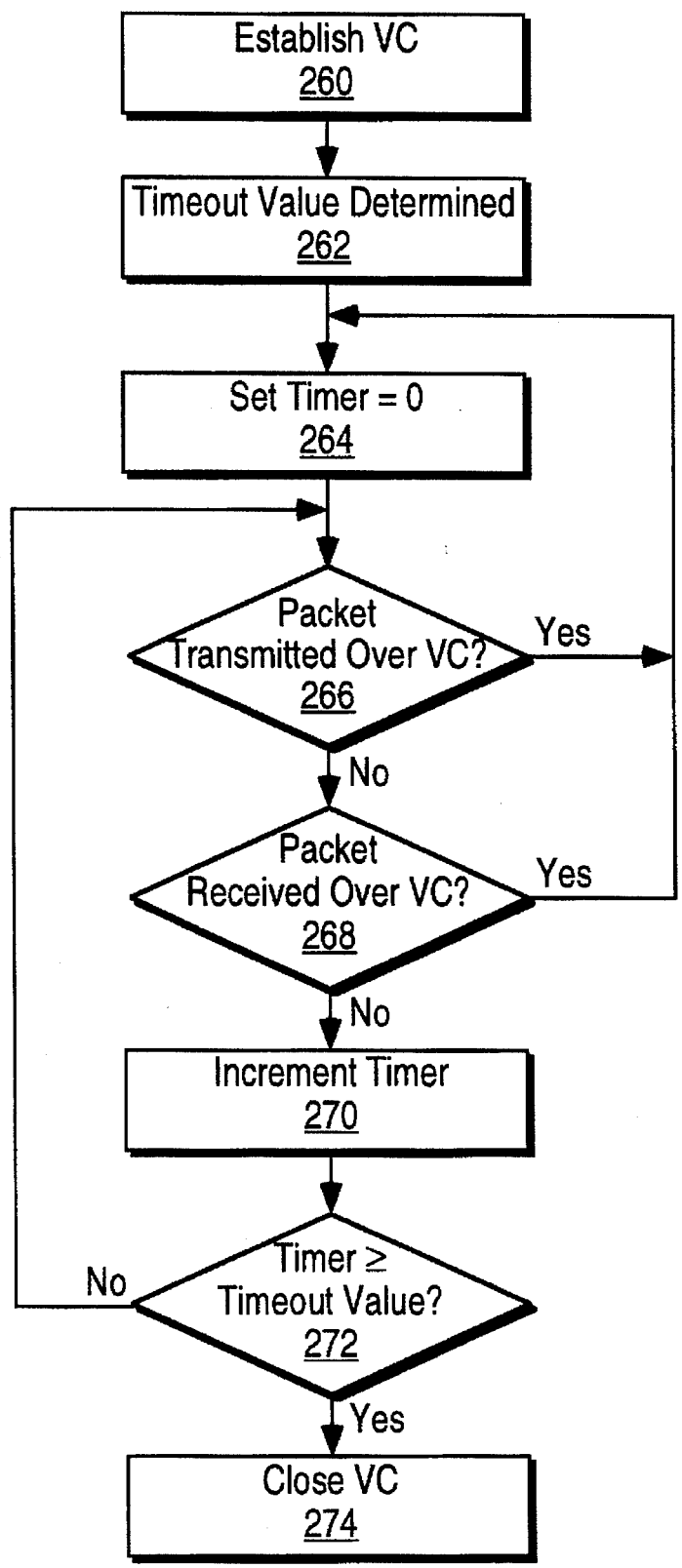
FIG. 6 is a flow diagram illustrating the procedure for determining when to close an existing virtual circuit.

Referring to FIG. 6, a flow diagram illustrates the procedure for determining when to close an established virtual circuit. The illustrated timing system monitors the utilization (or packet flow) of each established virtual circuit. Step 260 represents the time at which the particular virtual circuit is established. After the virtual circuit has been established, step 262 determines a timeout value for the new virtual circuit. This timeout value may be provided by the network operator or administrator, or may be provided as a default value. At step 264, the value of the timer is set to zero. Step 266 determines whether a packet has been transmitted over the virtual circuit. If a packet has been transmitted, then the routine branches to step 264 where the timer is reset. If no packet has been transmitted, the routine continues to step 268 which determines whether a packet has been received over the virtual circuit. If a packet has been received, the routine branches to step 264 where the timer is reset. If no packet has been received, the routine continues to step 270 where the timer is incremented. At step 272 the timer value is compared to the predetermined timeout value. If the timer value equals or exceeds the timeout value, then a signal is generated by the timer indicating that the virtual circuit should be closed at step 274. If the timer value is less than the timeout value, then the routine branches back to step 266.

The preceding description and embodiments describe utilizing the present invention in a network environment using a similar routing protocol for both the ATM switches and the routers. However, the present invention may also be utilized in network environments where "layered routing" is used. Layered routing uses different routing protocols; i.e., one protocol for the ATM subnetwork and another protocol for the routers.

Referring to FIG. 8, a particular network is illustrated having an ATM subnetwork represented as a single node 400. FIG. 8 also illustrates ten routers 402–420 coupled to one another and ATM subnetwork 400. Routing within subnetwork 400 is independent of routing between routers 402–420. Therefore, a different routing protocol is used for routing between the routers. For proper implementation of the present invention, the routers use a link state (or topology state) routing protocol. ATM switches (shown in FIG. 9) within ATM subnetwork 400 may use any available routing protocol, including static routing. In the preferred embodiment, the ATM switches use an integrated link state protocol.

FIG. 8 illustrates a logical router topology. Since two different routing protocols are used, the operation of the routing protocols is maintained relatively independent. Since the routers can forward packets using virtual circuits across ATM subnetwork 400, it is necessary to represent the capabilities of the subnetwork. If no virtual circuits are established across the ATM subnetwork, it is still necessary to advertise the availability of the ATM subnetwork into the router network. This advertising into the routing network may be accomplished by using an Open Shortest Path First (OSPF) routing protocol.

FIG. 8 represents the ATM subnetwork using the single node 400. Node 400 has a link to each router having an ATM interface. In the absence of any existing virtual circuits, the other routers in the network believe that node 400 is a normal router. An actual physical system in the network, such as one of the routers having a direct ATM interface, assumes the functions of representing node 400. Selecting the physical system to handle these functions may be done manually by configuring one particular system to represent node 400, or by running an election algorithm. Different election algorithms capable of being used with the present invention are provided by the OSPF, IS-IS, and PNNI routing protocols.

When a virtual circuit already exists, or is created, across the ATM subnetwork, an issue arises regarding when to advertise the existence of the virtual circuit into the router-to-router routing protocol. A first option is to refrain from advertising the existence of the virtual circuit. If this option is selected, the logical topology of the network as advertised into the routing protocol remains identical to that illustrated in FIG. 8. A second option explicitly advertises the existence of the virtual circuit. This option the topology illustrated in FIG. 8 is enhanced by adding links between routers corresponding to the existing virtual circuits. When using the second option, the metrics associated with the additional links would create a preference for existing virtual circuits, if available.

If a packet arrives at a router having an ATM interface and the correct path for the packet traverses the ATM subnetwork, then the questions of feasibility and efficiency arise. In this situation, the source router will have knowledge of the OSPF logical topology and knowledge regarding which virtual circuits are established to other routers. Additionally, the source router may have knowledge regarding details of the connections within the ATM subnetwork.

In a typical situation where layered routing is used, the routers bordering the ATM subnetwork do not participate in the routing operation in the ATM subnetwork. In this situation, a router only knows details of the logical router topology (e.g. the topology as illustrated in FIG. 8) and the existence of any virtual circuits attached to the router itself. Feasibility and efficiency in this case are calculated based only on the logical router topology. The progress made by virtual circuit "i" is represented by $P_i$. This progress is compared to the progress $P_o$ made by the optimal virtual circuit. The first two efficiency tests, as previously described, can be calculated ($P_i \geq k \cdot P_o$ and $P_i \geq P_{min}$). However, in this situation, the router does not know the cost associated with every virtual circuit in crossing the ATM subnetwork. Thus, the third efficiency test ($P_i \geq r \cdot C_i$) cannot be performed.

Figure 9:
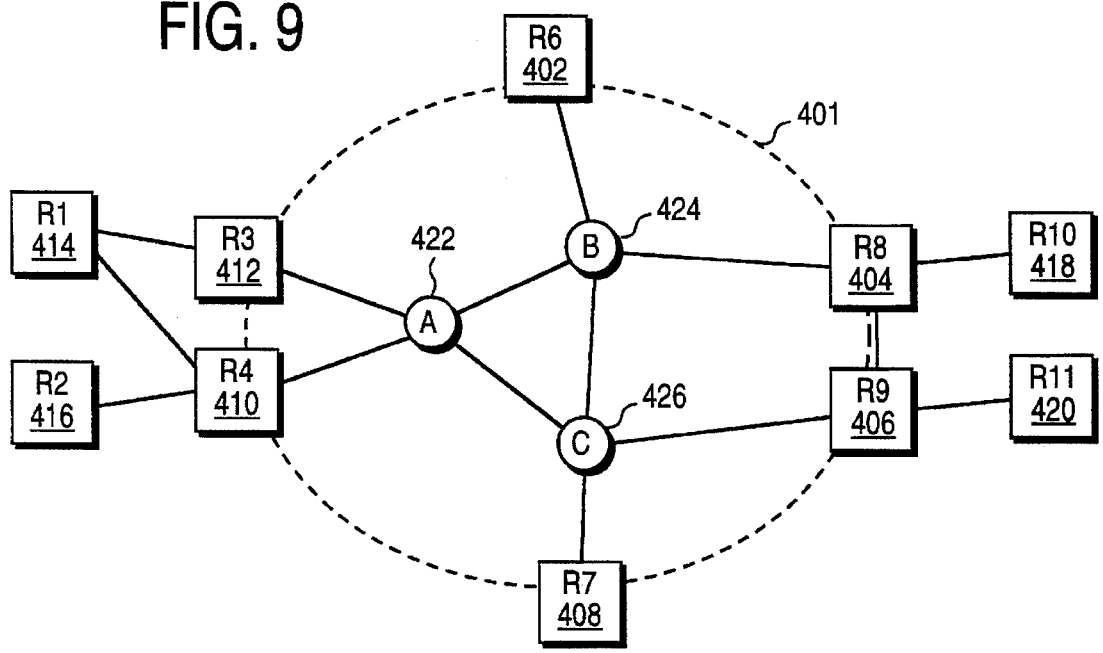
FIG. 9 illustrates the network diagram of FIG. 8 with additional details regarding the ATM subnetwork.

Referring to FIG. 9, a network configuration is illustrated similar to that of FIG. 8, where the ATM subnetwork is shown in greater detail (an enhanced topology). In this example, all ten routers (402–420) participate in a link state routing protocol, such as OSPF. FIG. 9 also illustrates three ATM switches 422, 424, and 426. The ATM switches and the routers bordering the ATM subnetwork (routers 402, 404, 406, 408, 410, and 412) participate in the operation of a separate link state or topology state routing protocol, such as IPNNI. In this example, the routers bordering the ATM subnetwork are capable of "understanding" the enhanced topology illustrated in FIG. 9. This "understanding" includes both the topology of the routers as advertised in one routing protocol, and the topology of the ATM subnetwork as advertised in a second routing protocol.

Comparing costs of links and nodes in the ATM subnetwork to costs of links and nodes in the router network in the enhanced topology, the metrics used by one routing protocol must be compared with metrics used by the second routing protocol. Those skilled in the art will appreciate that Lagrange multipliers may be used to compare dissimilar resource metrics.

The feasibility calculation ensures that packets will make continuous progress toward the destination without looping. Since forwarding datagrams is based on "hop-by-hop" routing, each router must make a consistent routing decision. This implies that all routers along the path must have the ability to make routing decisions based on the same topology database. The logical router topology is the only database that all routers, including those routers not attached to the ATM subnetwork, have in common. Therefore, the next hop across the ATM subnetwork chosen by a router must be feasible according to the logical router topology. However, the router may use additional information regarding the ATM subnetwork when selecting the best route from among multiple feasible routes.

Figure 10:
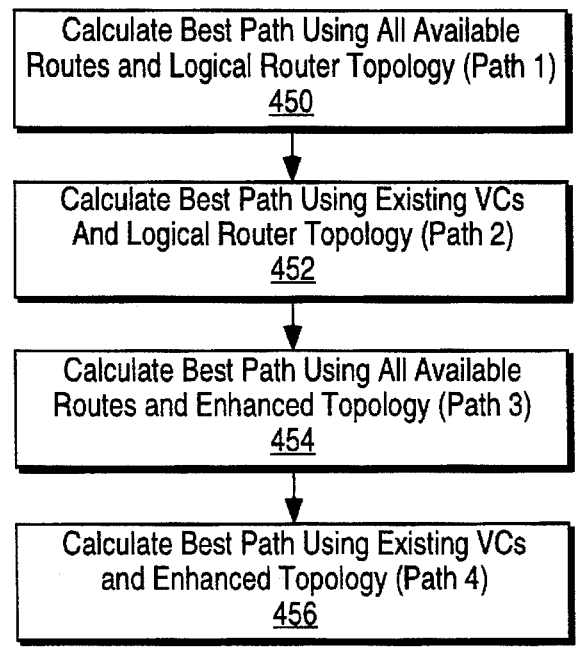
FIG. 10 is a flow diagram illustrating the calculations performed by a router in a layered routing network configuration.

FIG. 10 illustrates four different routing calculations which are required as part of the task of determining whether a new virtual circuit must be established for a specific packet. Each calculation is repeated only when new network data is available, and not in response to the arrival of a packet to be delivered. Step 450 calculates the best path to the destination using all available routes and the logical router topology. This path is referred to as the first path and is guaranteed to be feasible. Therefore, the first path will be used if no other feasible path is identified. The distance from the current router to the destination and the associated first hop progress can be calculated for this path more accurately by using the enhanced topology to measure the cost of the path. This computation is discussed below. The calculation performed at step 450 is the only calculation performed by routers which are not attached to the ATM subnetwork (e.g., routers 414–420 in FIG. 8). This calculation is equivalent to the standard router-to-router computation, such as the OSPF computation, performed by all routers.

Step 452 in FIG. 10 calculates the best path using only existing virtual circuits and the logical router topology. This path is referred to as the second path. The feasibility of a path calculated to any particular destination is easily verified using the logical router topology. If feasible, the efficiency of the second path is compared to the first path. The efficiency calculation will use the enhanced topology (discussed below). If feasible and efficient, the second path is preferred because it uses virtual circuits which are already established for the first hop, thereby eliminating the need to establish a new virtual circuit while a packet is waiting to be forwarded.

In one embodiment of the present invention, the calculation represented at step 452 is omitted. This calculation simply provides an additional opportunity to calculate feasible and efficient paths using existing virtual circuits if the computation in step 456 (described below) fails to identify a feasible and efficient path.

At step 454, the router calculates the best path using all available routes and the enhanced topology. This is referred to as the third path. If the third path to a particular destination calculated by this computation never returns to the ATM subnetwork after the first hop router, then the cost from the next hop router to the destination is an upper bound on the best possible cost from the first hop router to the destination using the first path. This can be compared to the cost of the first path to determine feasibility. If the third path is feasible, then it is the best feasible path based on all possible paths, and will be preferred over the first path.

If the third path to a particular destination crosses the ATM subnetwork after the first hop router, then the feasibility of the path cannot be determined without performing an additional Dijkstra computation. In this situation, computing time is conserved by not performing the Dijkstra computation and therefore rejecting this third path.

At step 456, the router calculates the best path using existing virtual circuits and the enhanced topology. This is referred to as the fourth path. If the fourth path to the destination never returns to the ATM subnetwork after the first hop, then feasibility may be determined in the manner described above with respect to step 454. If feasible, then the fourth path is the best feasible path based on existing virtual circuits and is preferred to the second path. If feasible, the fourth path may be compared for efficiency to the first and third paths. The efficiency calculation uses the enhanced topology. If both feasible and efficient, the fourth path will be preferred over the first and third paths because it uses virtual circuits which are already established for the first hop.

If the fourth path crosses the ATM subnetwork after the first hop router, then it cannot be used without additional "per existing virtual circuit" calculations, and is therefore rejected.

Figure 11:
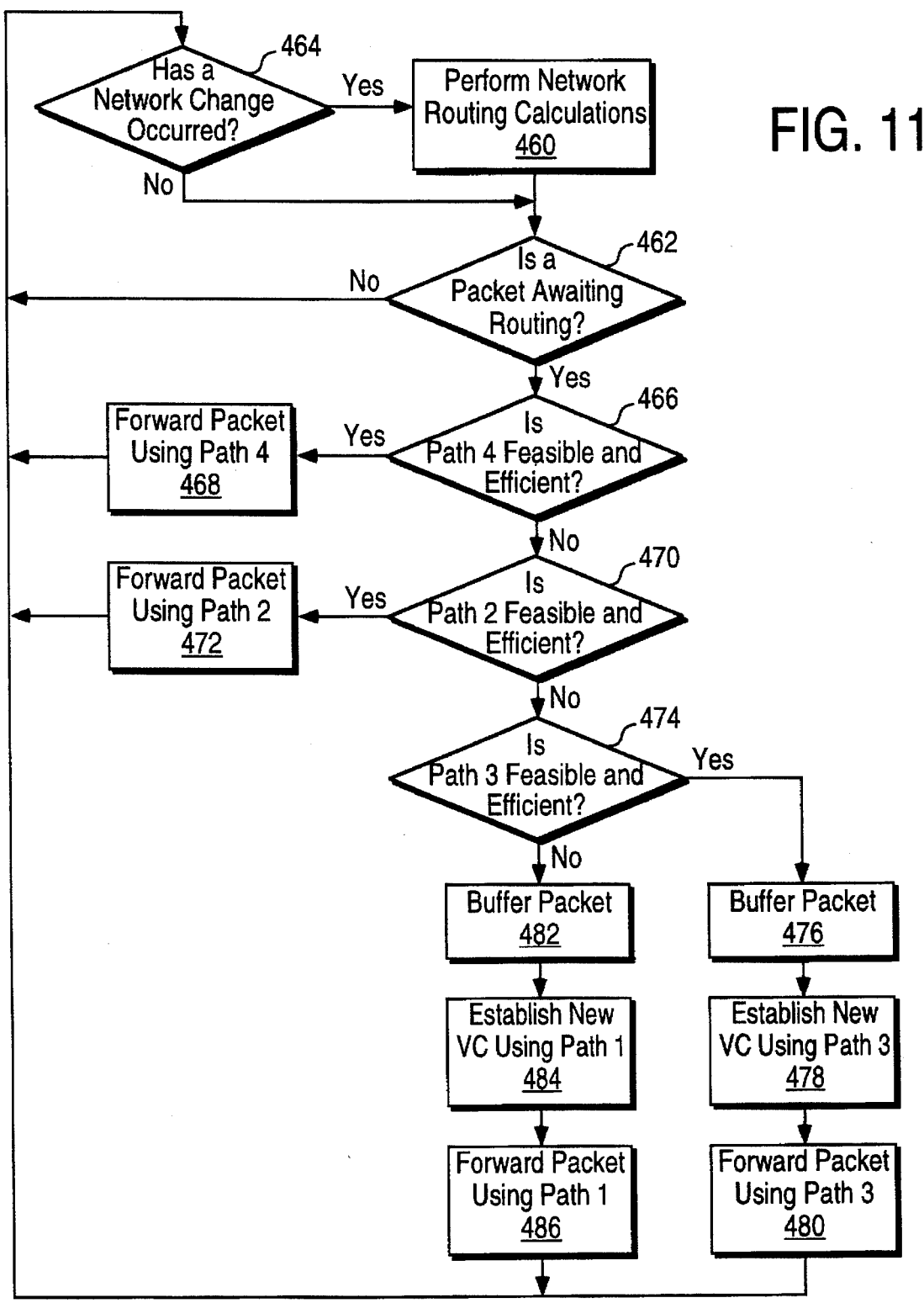
FIG. 11 is a flow diagram illustrating the selection of a particular path to a destination.

After performing the calculations of steps 450–456, a path is selected based on the preferences illustrated in FIG. 11. The network routing calculations referred to in step 460 correspond to the calculations illustrated in FIG. 10.

At step 462, if a packet is not awaiting routing, then the routine branches to step 464 to determine whether a network change has occurred. If a network change has occurred, then the routine branches to step 460, otherwise the routine branches to step 462.

If a packet is waiting at step 462, then the routine proceeds to step 466 to determine whether path 4 is feasible and efficient. If path 4 is feasible and efficient, then it is selected and used to forward the packet toward its destination at step 468.

If path 4 is inefficient or not feasible, then step 470 determines whether path 2 is feasible and efficient. If path 2 is feasible and efficient, then it is selected and used to forward the packet toward its destination at step 472.

If path 2 is inefficient or not feasible, then step 474 determines whether path 3 is feasible and efficient. If path 3 is feasible and efficient, then the packet is buffered at step 476 while a new virtual circuit is established at step 478 using path 3. At step 480, the packet is forwarded toward its destination using path 3.

If step 474 determines that path 3 is inefficient or not feasible, then the packet is buffered at step 482 while a new virtual circuit is established at step 484 using path 1. At step 486, the packet is forwarded toward its destination using path 1.

As discussed above, the first path is always feasible. At step 474, if the third path is feasible and efficient, then it is preferred to the first path. In this case, the third path is used for the purpose of calculating the efficiency of other paths. If the third path is not feasible, then the first path remains the preferred path.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. A method for routing packets in a network having a connection-oriented subnetwork, a plurality of routers coupled to said connection-oriented subnetwork, and a plurality of established virtual circuits, said method comprising the steps of:

receiving a packet to be routed toward a packet destination;

identifying a best existing virtual circuit from said plurality of established virtual circuits;

determining whether said best existing virtual circuit is feasible for forwarding said packet toward said packet destination;

determining whether said best existing virtual circuit is efficient for forwarding said packet toward said packet destination;

forwarding said packet toward said packet destination using said best existing virtual circuit if said best existing virtual circuit is feasible and efficient; and establishing a new virtual circuit across said connection-oriented subnetwork to an optimal next hop router and forwarding said packet toward said packet destination using said new virtual circuit if said best existing virtual circuit is not both feasible and efficient.

2. The method of claim 1 wherein said step of determining whether said best existing virtual circuit is feasible includes determining whether said best existing virtual circuit is capable of forwarding said packet toward said packet destination and avoiding looping of said packet.

3. The method of claim 1 wherein said step of determining whether said best existing virtual circuit is feasible includes:

determining a first distance to said packet destination considering all possible virtual circuits across said connection-oriented subnetwork; and determining a second distance from an opposite end of an established virtual circuit to said packet destination; and determining that said best existing virtual circuit is feasible if said second distance is less than said first distance.

4. The method of claim 1 wherein said step of determining whether said best existing virtual circuit is efficient includes testing said best existing virtual circuit to determine whether using said best existing virtual circuit makes a particular minimum progress toward said packet destination.

5. The method of claim 4 wherein said minimum progress toward said packet destination is a predetermined fraction of the progress made by an optimal virtual circuit.

6. The method of claim 4 wherein said minimum progress toward said packet destination is a predetermined fraction of a cost associated with traversing said best existing virtual circuit.

7. The method of claim 1 wherein said connection-oriented subnetwork is an asynchronous transfer mode (ATM) subnetwork including a plurality of ATM switches.

8. The method of claim 1 further including the step of analyzing each established virtual circuit for determining whether said virtual circuit should be closed.

9. The method of claim 1 further including the steps of:

providing a timer for each established virtual circuit for determining the utilization of said virtual circuit;

resetting said timer when a packet is detected on said virtual circuit;

incrementing said timer when a packet absence is detected on said virtual circuit; and closing said virtual circuit when said timer reaches a predetermined timeout value.

10. In a network having a plurality of routers attached to a connection-oriented subnetwork and a plurality of virtual circuits established to forward packets across said connection-oriented subnetwork, a method for routing said packets from source routers toward packet destinations comprising the steps of:

receiving a packet to be routed toward a packet destination;

determining a best existing virtual circuit from said plurality of established virtual circuits;

determining whether said best existing virtual circuit is feasible, said best existing virtual circuit being feasible if capable of forwarding said packet toward said packet destination and avoiding looping of said packet;

forwarding said packet toward said packet destination using said best existing virtual circuit if said best existing virtual circuit is feasible; and establishing a new virtual circuit across said connection-oriented subnetwork to an optimal next hop router and forwarding said packet toward said packet destination using said new virtual circuit if said best existing virtual circuit is not feasible.

11. The method of claim 10 wherein said step of determining whether said best existing virtual circuit is feasible includes:

determining a first distance to said packet destination considering all possible virtual circuits across said connection-oriented subnetwork;

determining a second distance from an opposite end of an established virtual circuit to said packet destination; and determining that said best existing virtual circuit is feasible if said second distance is less than said first distance.

12. The method of claim 10 wherein said connection-oriented subnetwork is an asynchronous transfer mode (ATM) subnetwork including a plurality of ATM switches.

13. The method of claim 10 further including the step of analyzing each established virtual circuit for determining whether said virtual circuit should be closed.

14. The method of claim 10 further including the steps of:

providing a timer for each established virtual circuit for determining the utilization of said virtual circuit;

resetting said timer when a packet is detected on said virtual circuit;

incrementing said timer when a packet absence is detected on said virtual circuit; and closing said virtual circuit when said timer reaches a predetermined timeout value.

15. A method for routing packets in a network having a connection-oriented subnetwork, a plurality of routers coupled to said connection-oriented subnetwork, and a plurality of established virtual circuits, said method comprising the steps of:

receiving a packet to be routed toward a packet destination;

identifying feasible virtual circuits from said plurality of established virtual circuits;

determining an efficiency for each identified feasible virtual circuit, said efficiency representing the progress accomplished by said identified feasible virtual circuit in forwarding said packet toward said packet destination;

identifying a best existing virtual circuit from said identified feasible virtual circuits based on said efficiency of each identified feasible virtual circuit;

forwarding said packet toward said packet destination using said best existing virtual circuit if said best existing virtual circuit is identified; and establishing a new virtual circuit across said connection-oriented subnetwork to an optimal next hop router and forwarding said packet toward said packet destination using said new virtual circuit if said best existing virtual circuit is not identified.

16. The method of claim 15 wherein said step of identifying feasible virtual circuits includes:

determining a first distance to said packet destination considering all possible virtual circuits across said connection-oriented subnetwork;

determining a second distance from an opposite end of an established virtual circuit to said packet destination; and determining that said best existing virtual circuit is feasible if said second distance is less than said first distance.

17. The method of claim 15 wherein said connection-oriented subnetwork is an asynchronous transfer mode (ATM) subnetwork including a plurality of ATM switches.

18. An apparatus for forwarding packets in a network having a connection-oriented subnetwork, a plurality of routers coupled to said connection-oriented subnetwork, and a plurality of virtual circuits established across said connection-oriented subnetwork, said apparatus comprising:

a router capable of receiving a packet to be forwarded toward a packet destination;

means within said router for identifying a best existing virtual circuit from said plurality of established virtual circuits;

means within said router for determining whether said best existing virtual circuit is feasible for forwarding said packet toward said packet destination;

means within said router for determining whether said best existing virtual circuit is efficient for forwarding said packet toward said packet destination;

means within said router for forwarding said packet toward said packet destination using said best existing virtual circuit, said means for forwarding being utilized only when said best existing virtual circuit is both feasible and efficient; and means within said router for establishing a new virtual circuit across said connection-oriented subnetwork to an optimal next hop router and forwarding said packet toward said packet destination using said new virtual circuit if said best existing virtual circuit is not both feasible and efficient.

19. The apparatus of claim 18 wherein said means for determining whether said best existing virtual circuit is feasible includes an algorithm executed by said router for determining whether said best existing virtual circuit is capable of forwarding said packet toward said packet destination without looping.

20. The apparatus of claim 18 wherein said means for determining whether said best existing virtual circuit is efficient includes an algorithm executed by said router for testing said best existing virtual circuit to determine whether using said best existing virtual circuit makes a particular minimum progress toward said packet destination.

21. The apparatus of claim 18 wherein said connection-oriented subnetwork is an asynchronous transfer mode (ATM) subnetwork including a plurality of ATM switches.

22. The apparatus of claim 18 further including:

a timer for each established virtual circuit for determining the utilization of said virtual circuit, said timer capable of being reset when a packet is detected on said virtual circuit and incremented when a packet absence is detected on said virtual circuit.

23. The apparatus of claim 22 wherein said timer is capable of generating a signal to close said established virtual circuit when said timer reaches a predetermined timeout value.

* * * * *